US006407516B1

(12) United States Patent
Victor

(10) Patent No.: US 6,407,516 B1
(45) Date of Patent: Jun. 18, 2002

(54) FREE SPACE ELECTRON SWITCH

(75) Inventor: Michel Victor, Fenton, MI (US)

(73) Assignee: Exaconnect Inc., Flint, MI (US)

( * ) Notice: Subject to any disclaimer, the term of this patent is extended or adjusted under 35 U.S.C. 154(b) by 0 days.

(21) Appl. No.: 09/731,216

(22) Filed: Dec. 6, 2000

Related U.S. Application Data

(60) Provisional application No. 60/232,927, filed on Sep. 15, 2000, and provisional application No. 60/207,391, filed on May 26, 2000.

(51) Int. Cl.[7] ............................................. G06F 3/153

(52) U.S. Cl. ......................... 315/365; 315/94; 313/373; 313/414; 313/542

(58) Field of Search ................................ 315/365, 403, 315/40, 94; 313/373, 382, 383, 409, 414, 417, 542, 238

(56) References Cited

U.S. PATENT DOCUMENTS

| | | | | |
|---|---|---|---|---|
| 2,667,599 A | | 1/1954 | Rajchman | 315/11 |
| 3,641,384 A | | 2/1972 | Lund et al. | 313/161 |
| 3,740,607 A | | 6/1973 | Silzars et al. | 315/15 |
| 3,749,961 A | | 7/1973 | Bates et al. | 315/3 |
| 3,893,157 A | | 7/1975 | Silzars et al. | 357/69 |
| 3,935,500 A | * | 1/1976 | Oess et al. | 313/302 |
| 3,936,690 A | | 2/1976 | Salgo | 313/392 |
| 3,943,277 A | | 3/1976 | Everly et al. | 178/6.8 |
| 3,980,919 A | | 9/1976 | Bates et al. | 313/453 |
| 4,110,749 A | | 8/1978 | Janko et al. | 340/365 C |
| 4,207,492 A | | 6/1980 | Tomison et al. | 315/3 |
| 4,213,192 A | | 7/1980 | Christensen, Sr. | 365/118 |
| 4,280,186 A | | 7/1981 | Hidai et al. | 364/518 |
| 4,328,466 A | | 5/1982 | Norris Jr. et al. | 330/308 |
| 4,333,035 A | | 6/1982 | Parker et al. | 313/411 |
| 4,663,559 A | | 5/1987 | Christensen | 313/336 |
| 4,725,736 A | | 2/1988 | Crewe | 250/396 R |
| 4,760,567 A | | 7/1988 | Crewe | 369/101 |
| 4,764,818 A | | 8/1988 | Crew | 358/347 |
| 4,817,053 A | | 3/1989 | Ikeda et al. | 365/113 |
| 5,012,153 A | | 4/1991 | Atkinson et al. | 313/336 |
| 5,068,580 A | | 11/1991 | Smith et al. | 315/366 |
| 5,077,143 A | | 12/1991 | Barraclough et al. | 428/690 |
| 5,150,019 A | | 9/1992 | Thomas et al. | 315/350 |
| 5,475,280 A | | 12/1995 | Jones et al. | 313/309 |
| 5,541,473 A | | 7/1996 | Duboc, Jr. et al. | 313/422 |
| 5,557,177 A | | 9/1996 | Engle | 315/336 |
| 5,557,596 A | | 9/1996 | Gibson et al. | 369/101 |

(List continued on next page.)

FOREIGN PATENT DOCUMENTS

| | | |
|---|---|---|
| EP | 0 265 888 A2 A3 | 5/1988 |
| EP | 0 306 173 A1 | 3/1989 |
| EP | 9 530 981 A1 | 3/1993 |
| ES | 2 024 941 | 1/1992 |
| GB | 1417297 | 12/1975 |
| GB | 2 318 208 A | 4/1998 |
| JP | 11204047 | 7/1999 |

OTHER PUBLICATIONS

Yoshiko Hara, "Cold Cathode Emitter Promises Ultra–Bright Flat Panels", EETimes. com, http://eet/com/news/97/947 news/emitter.html, 2 pgs.

W.J. Orvis, et al., "A Progress Report on the Livermore Miniature Vacuum Tube Project", 1989, pp. 20.3.1–20.4.4.

*Primary Examiner*—Don Wong
*Assistant Examiner*—Thuy Vinh Tran
(74) *Attorney, Agent, or Firm*—Harness, Dickey & Pierce, P.L.C.

(57) ABSTRACT

A free space electron switch is disclosed. The switch, which is useful in high speed telecommunications traffic, has an array of cathodes for emitting free space electrons. A grid of aiming anodes and, a focusing grid for forming electrons from the cathode into an electron beam are provided. A plurality of output ports for receiving the electron beam from each cathode is provided, the output ports having a phosphor coating facing the side of the channel remote from the cathode.

37 Claims, 4 Drawing Sheets

U.S. PATENT DOCUMENTS

| | | | | |
|---|---|---|---|---|
| 5,561,339 | A | 10/1996 | Jones et al. | 313/309 |
| 5,572,042 | A | 11/1996 | Thomas et al. | 257/10 |
| 5,578,901 | A | 11/1996 | Blanchet-Fincher et al. | 313/496 |
| 5,608,283 | A | 3/1997 | Twichell et al. | 313/309 |
| 5,650,337 | A | 7/1997 | Cahen et al. | 437/16 |
| 5,746,635 | A | 5/1998 | Spindt et al. | 445/24 |
| 5,767,620 | A | 6/1998 | Onodaka | 313/495 |
| 5,793,155 | A | 8/1998 | Vasche | 313/309 |
| 5,814,926 | A | 9/1998 | Tomihari | 313/309 |
| 5,834,331 | A | 11/1998 | Razeghi | 438/40 |
| 5,858,619 | A | 1/1999 | Chang et al. | 430/312 |
| 5,869,842 | A | 2/1999 | Kang et al. | 250/551 |
| 5,894,188 | A | 4/1999 | Chakvorty et al. | 313/309 |
| 5,986,399 | A | 11/1999 | VanVeen et al. | 313/495 |
| 6,002,199 | A | 12/1999 | Spindt et al. | 313/309 |
| 6,008,126 | A | 12/1999 | Leedy | 438/667 |
| 6,010,918 | A | 1/2000 | Marino et al. | 438/20 |
| 6,020,257 | A | 2/2000 | Leedy | 438/626 |
| 6,040,808 | A | 3/2000 | Knox et al. | 345/13 |
| 6,042,900 | A | 3/2000 | Rakhimov et al. | 427/577 |
| 6,051,921 | A | 4/2000 | Beetson et al. | 313/433 |
| 6,057,636 | A | 5/2000 | Sakai et al. | 313/306 |
| 6,060,331 | A | 5/2000 | Shakouri et al. | 438/22 |
| 6,097,092 | A | 8/2000 | Natzle | 257/758 |
| 6,124,665 | A | 9/2000 | Derraa | 313/309 |
| 6,137,214 | A | 10/2000 | Raina | 313/309 |
| 6,144,144 | A | 11/2000 | Cleeves et al. | 313/309 |
| 6,171,971 | B1 | 1/2001 | Natzle | 438/706 |
| 6,201,343 | B1 | 3/2001 | Spindt et al. | 313/310 |
| 6,201,851 | B1 | 3/2001 | Piestrup et al. | 378/121 |
| 6,204,087 | B1 | 3/2001 | Parker et al. | 438/56 |
| 6,204,596 | B1 | 3/2001 | Macaulay et al. | 313/310 |
| 6,215,243 | B1 | 4/2001 | Janning | 313/496 |

* cited by examiner

FREE SPACE ELECTRON SWITCH

This appl. claims priority from provisional applications Ser. Nos. 60/232,927, filed Sep. 15, 200, and 60/207,391, filed May 26, 2000

FIELD OF THE INVENTION

The present invention generally relates to a switch for a communication network, and more particularly to a cross-connect switch that utilizes a grid of cathodes that generate free space electrons. The free space electrons are accumulated and directed toward a grid of receiving anodes.

BACKGROUND & SUMMARY

Virtually all of the telecommunications backbone of the nation consists of highly specialized fiber optic systems. Although photons are ideally suited for transmission through a solid medium, because they are highly non-reactive both to their medium and to each other, they are ill suited for processing and switching. Purely optical switching has proven difficult since photons cannot be steered without modifying the physical medium through which they travel, for example by reflecting them off of aimable mirrors or by passing them through variable-twist LCD molecules or temperature-sensitive crystals. The process of modifying the physical medium in order to steer a photon beam tends to be slow and unwieldy; few photonic switching technologies are fast enough for packet-by-packet switching, and the ones that (binary, two position micro-mirrors) cannot be scaled to sufficient port counts.

One method of switching photons is MEMS-Based Movable Mirrors Switches. Movable mirrors switches fall into two categories-switches that use infinitely adjustable mirrors (analog MEMS switches), and switches that use two position mirrors (digital MEMS switches). Digital MEMS switches has potentially very low switching latency, but they are not scalable. The number of internal components in a digital MEMS switch increases exponentially as the number of ports increases, making them difficult to scale beyond just a few hundred ports. A 1,000 port digital MEMS switch would require about 240,000 mirrors, and 2,000 ports would simply be unattainable. As a result, all large-scale MEMS switches use analog, infinitely adjustable mirrors, which allow for greater scalability. It has been reported that analog MEMS switches with over 1,000 ports are close to production. However, it will take several years for these switches to scale beyond 4,000 ports. Additionally, these analog MEMS switches have very high switching latency; all existing switches require milliseconds to switch, and this is not likely to decrease in the foreseeable future.

To date, serious questions exist about the longevity and reliability of MEMS switches. For example, the longest-living analog MEMS switch survives on the order of one billion switching cycles. Therefore, if any analog MEMS switch could switch quickly enough to switch packets at commercially acceptable rates, it would barely survive one minute before reaching the end of its operating life. Furthermore, MEMS switches are sensitive to shocks and are fragile. Another disadvantage of the current generation of MEMS switches is that they are bulky. For example, a 1152 micro-mirror port switch produced by Xros is purported to occupy 2½ 7-foot bays. The footprint of MEMS switches is likely to decrease in the future.

Finally, the ability to switch without the use of regenerator lasers and their requisite electronic conversion is widely considered to be the key advantage of photonic switches such as MEMS switches. However, practical lambda-by-lambda switching requires more than passively redirecting lambdas from fiber to fiber. In order to prevent wavelength "collisions", it is necessary to change the wavelength of the lambdas as they hop from switch to switch. This requires the use of regenerator lasers. Tunable lasers do not mitigate this problem, since they still require that a given wavelength be reserved from end-to-end of the network. The collision problem can be attacked either by wasting circuits, i.e., by making available many times the number of circuits than are strictly necessary to handle the required bandwidth while avoiding wavelength collisions, or by using regenerating lasers at each switch hop to change the wavelength of the lambdas as needed to avoid collisions. The inevitability of significantly less expensive lasers, and the high cost of circuits given the low port count of today's switches will heavily weigh the argument in favor of using more lasers rather than creating more circuits.

It is worth noting that all current generation MEMS switches require the use of regenerators even in coarse, fiber-by-fiber switching applications, because of a lack of reflectivity in the mirrors. Several manufacturers purportedly have found ways to increase the reflectivity of their mirrors, e.g., by gold-plating them. However, it is not clear that this will eliminate the need for regenerator lasers, especially in real-world networks that have multiple hops and long-haul links. Overall, it seems very likely that MEMS switches will continue to require regenerator lasers for any real-world lambda-switching application.

Several other photonic switching technologies compete with MEMS switches in optical switching applications. These include the Agilent "bubble" switch, LCD switches from several manufacturers, switches that steer light using temperature-sensitive crystals, and others. However, these technologies suffer from a lack of scalability (LCD switches and bubble switches) and high switching latency (all of them). Early claims that LCD switches might be able to switch at nanosecond speeds in the foreseeable future have proven untrue.

Another method of electronic switching is by the use of single-stage crossbars. A crossbar is a semiconductor-based logic device that is used for switching. The main disadvantage of single-stage crossbars is scalability: the number of internal components in a crossbar increases exponentially or nearly exponentially as the number of ports increases. As a result, most existing crossbars have a maximum of 64-ports. New but very complex internal interconnect schemes allow port count to be increased to 512. However, neither type of crossbar is likely to increase in size beyond that in the foreseeable future, since a large increase in the number of internal components is needed to realize an incremental increase in port count.

Crossbars are also limited by the clock speed of their logic gates, which is typically at or below a single GHz. To obtain higher port speeds, multiple slower ports must be combined in order to create a single fast port, which greatly decreases overall port count. For example, with a crossbar that runs at 622 MHz, 66 ports must be combined to create a single OC-768 port. Also, the demultiplexers and multiplexers that separate the bit stream and then recombine it is complex and requires exotic technology, especially for OC-192 bit rates and beyond.

Clos is an interconnection topology that allows smaller crossbars to be combined to form a larger, higher port count switch. Almost all-existing and planned crossbar-based switches are built using the Clos topology. For example, Growth Networks was a switch startup that was developing a 512-port OC-48 Clos-interconnected crossbar switch.

Clos requires a large number of crossbars in order to obtain a given port count-roughly 3.5 times the total port count divided by the number of ports per crossbar. As a result, Clos-interconnected crossbar switches have very large footprints-the Growth Networks switch will require a full 7-foot tall bay for 512 OC-48 ports. Also, all of those crossbars ICs consume a huge amount of power.

Latency (switching speed) is also a problem with Clos switches. Semiconductor Clos switches typically require tens to hundreds of microseconds to establish a connection from an input port to an output port. Moreover, their switching latency is non-deterministic, which means that the amount of time needed to establish a connection is highly unpredictable. In packet-by-packet switching applications, this greatly increases the complexity of the packet forwarding engines and traffic managers that control the switch, since it is difficult for the switch to guarantee FIFO packet behavior. It also introduces unwanted effects into the output packet stream such as jitter. Furthermore, these problems become worse as the switch becomes larger. It is likely that many of the Clos crossbar-based electronic switches that are used within OEO optical cross-connects have so much latency, and such non-deterministic latency, that they would be unsuitable for packet-by-packet switching.

Board to board connector density is also a serious problem with Clos switches. In large Clos switches, nearly four out of every five interconnects are internal to the switch and cannot be used for external, through-switch bandwidth. Therefore, Clos-based switches are limited by the connector density, trace density, and interconnects needed to create all of this internal intra-switch bandwidth. As a result, it has been suggested that Clos switches hit hard limits in terms of board-to-board connector density at 512 ports.

Also, because of their high component count, reliability is an important issue with semiconductor Clos switches. Any switch that consists of a full bay of ICs must support complex failure-recovery and rerouting capabilities. Finally, as with all semiconductor logic-based switches, bit rate per port is limited by the clock rate of their logic gates. The same issues that limit single stage crossbars limit multi-stage crossbars. With a clock rate of 622 MHz, 66 ports would have to be combined to create a single OC-768 port.

On the other hand, electrons are ideally suited for switching. Electrons can be easily steered by electrostatic and electromagnetic fields. However, previous electron switches have steered electrons through digital logic gates on semiconductors. These devices have proved complex and difficult to scale in switching applications, and they are limited by the slow speed at which their solid-state logic gates are capable of switching.

The switch of the current invention steers electrons through freespace rather than through semiconductors, in a manner that is similar to a CRT display. In a CRT display, electrons travel from the electron gun that is at the back of the CRT to an array of phosphors at the front of the CRT. The beam from the electron gun is magnetically steered to selectively illuminate the phosphors. The switch uses an array of electron emitters rather than a single electron gun. Each input port is associated with an electron gun and each output port is associated with an electron detector, which is implemented as a simple conductor. Data is transmitted from an input port to an output port by electrostatically aiming the input port's electron beam toward the output port's detector, and then modulating the beam.

Although the switch of the present invention converts photons to electrons and then back to photons, and is an electronic switch, it does not use the slow, bulky semiconductor-based logic devices that the term "electronic" has come to imply. In fact, it is not even a digital switch. It simply creates an analog transmission line from the input port to the output port. Moreover, this transmission line is an ideal transmission line, with low impedance (even freespace has some impedance), very fast propagation, zero voltage drop (it can even amplify the signal), and no crosstalk. This transmission line has almost unlimited throughput, and can operate at OC-768 speeds and beyond. The switch uses electrons for precisely what they are best at, and as a result it is better than either photonic or traditional electronic switches.

BRIEF DESCRIPTION OF THE DRAWINGS

Still other advantages of the present invention will become apparent to those skilled in the art after reading the following specification and by reference to the drawings in which.

DETAILED DESCRIPTION

Figure 1:
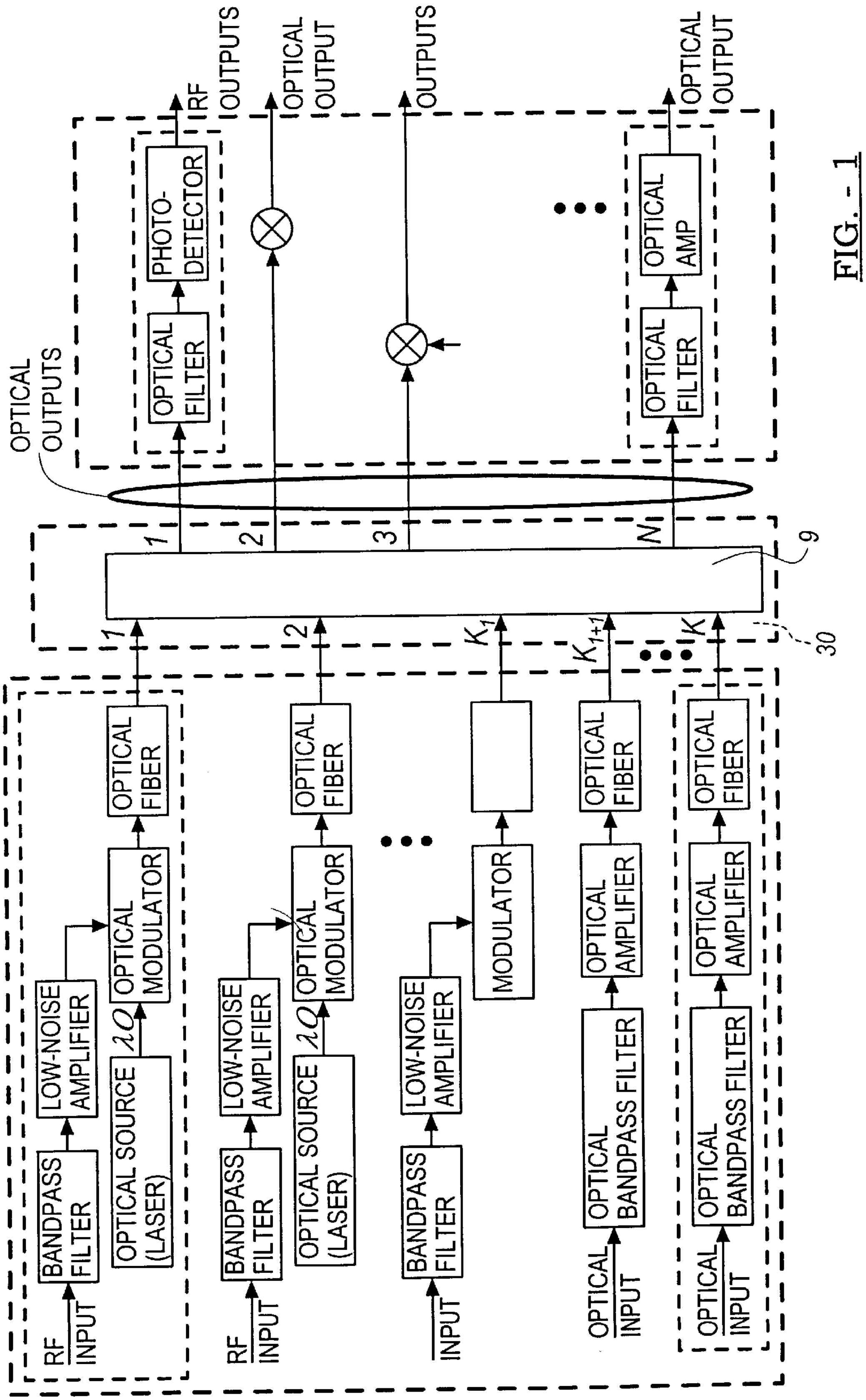
FIG. 1 shows the switching system within its environment.
Figure 2:
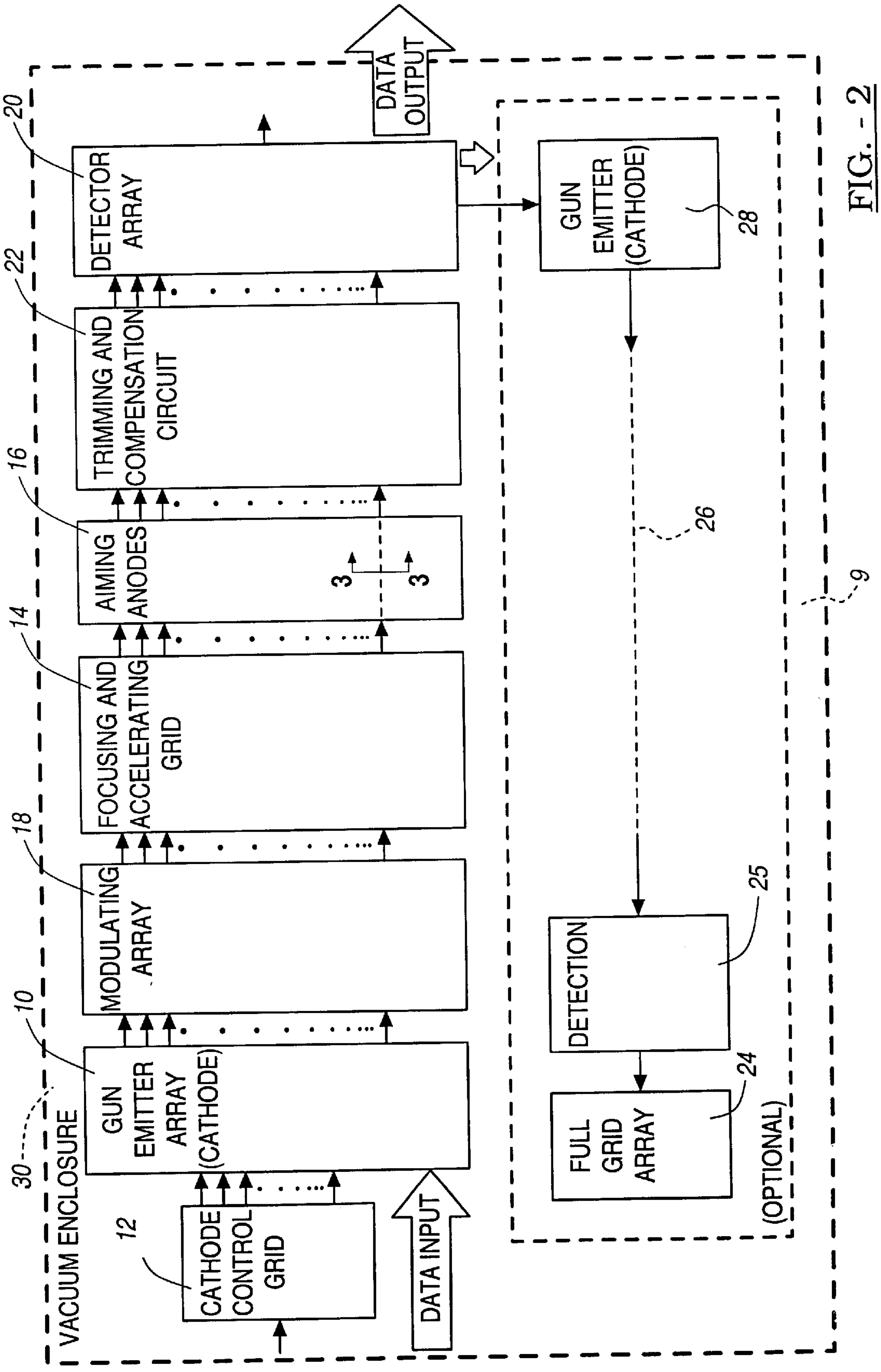
FIG. 2 discloses a block diagram of the components of the switch of he current invention.

FIG. 1 discloses a diagram of the switch 9 within the network environment. As can be seen, inputs of varying types from an RF input to a hardwire input or an optical input can be directed into the switch. It is envisioned that the emitter array 10 can contain of a number of varying types of cathodes including hot cathodes, cold cathodes, and photocathodes. Each of these would be useful and applicable for use with varying types of inputs. The switch 9 is generally formed by a number of discrete independent components. The first of which is an array of discrete cathodes 11, which receives data inputs from a variety of input lines. The array of discrete cathodes 11 is controlled by a cathode control grid 12 which preferably utilizes standard switch control components to analyze packet data to determine the target location on the detector array 20 for each given input. The switch 9 further has a modulating array 18, which converts the signals that arrive on the input side of the switch 9 into voltage modulations of the electron beams generated by the cathode control grid 12. The next layer of the switch 9 is a focusing and acceleration grid 14 which, steer the emissions from the cathodes 11 to the target port. A series of aiming anodes 16 which can be deposited on the using a mask are used to steer the emissions to the target port on the detector array 20. Optionally, the switch 9 can use trimming and compensation for nearby electric fields. The entire switch 9 is enclosed within a vacuum enclosure 30.

The emitter array 10 will consist of an array of cathodes 11. Several types of cathodes may be used to form the emitter array 10, including thermionic cathodes 11*a*, cold cathodes 11*b*, and photocathodes 11*c*. Different types of cathodes are suitable for different applications.

Photocathodes 11*c* are ideally suited for applications in which the input is photonic, since photocathodes 11*c* directly convert photons to freespace electrons. Also, photocathodes 11*c* have very fast response time, allowing the use of very high data rates. Furthermore, the input photon stream may modulate photocathodes 11*c* directly, without the use of a gate cathode.

A 5–70 micron photocathode 11*c* is deposited onto the die. The 5–70 micron size is determined by emission characteristics of the photocathode 11*c* which tends to sputter at sizes below 100 microns.

In applications in which the input signal will be electronic rather than photonic, an emitter array 10 of cold cathodes 11*b* may be used. Cold cathodes 11*b* are smaller than thermionic cathodes 11*a* and they do not generate significant heat. However, unlike photocathodes 11*c*, it is difficult to modulate a cold cathode 11*b* directly. Instead, the cold cathodes 11*b* will be "always on", and modulation will be effected by a gate cathode that is disposed between the emitting cathode and the accelerating anodes.

Many fabrication techniques may be used to create the emitter array 10. These include building it manually or fabricating it on a silicon wafer 31 using microfabrication techniques. Microfabrication creates a high probability for defects. However, in many applications the switch 9 will be highly defect tolerant, and defective emitters will be tolerated by simply not being used. For example, in an optical cross connect application, each cathode 11 will correspond to one data channel on an input line. With up to hundreds of thousands or even millions of channels per fiber, defective channels can be safely ignored as long as this relaxation of defect tolerance results in a significant decrease in cost per channel. Defects can not be tolerated in situation in which the switch is used as a component within someone else's system.

The emitter array 10 will be built on a silicon die 31. 100-micron cold cathodes 11*b* is deposited onto the die at a 200-micron pitch. The 100-micron size is determined by emission characteristics of the cold cathodes 11*b*, which tends to "sputter" at sizes below 100 microns.

With a single emitter assembly 40 pitch of 200 microns, 4,096 emitter assemblies 40 will fit within a square that is about 25 mm on a side, 16K emitter assemblies 40 will fit within 25 mm, and 96K emitter assemblies 40 will fit within 63 mm. The switch 9 is highly defect-tolerant, and yield, although expected to be high, will not be an issue even with the larger wafer sizes. Defective emitter assemblies 40 will simply not be used.

It will be necessary to turn the single emitter assembly 40 completely off when steering from one output port 21 to another, in order to avoid sending false signals to intermediate ports. This will be done by cutting power to the single emitter assembly 40 cathode 11. The cathode 11 runs on very little power, on the order of millivolts, so the switch 9 that cycles the cathode 11 does not need to be a high-voltage device. Also, because power only needs to be cycled while steering from one port to another, nanosecond cycling rates will be acceptable. The cathode 11 will not be responsible for modulating the single emitter assembly 40 to send data from one output port 21 to another. This is done by the modulating array 18, which is described later.

The emissions produced by the cathodes 11 must be focused and accelerated before they can be steered toward the target output port 21. Many methods for accomplishing this have been described in prior art. For example, U.S. Pat. 6,051,921 describes a flat panel display that uses a "magnetic matrix" to focus the electron beam and simple anodes to accelerate the electrons. Other techniques use anodes for both accelerating and focusing.

The emissions produced by the cathodes 11 must be focused and accelerated before they can steered toward the output port 21. This will be accomplished by several layers of positively charged lattices (14, 16, and 18). Each lattice (14, 16, and 18) will consist of a conductor with a grid of passages provided over the cathodes 11. The entire conductor will be positively charged to a voltage of several kilovolts. A number of these lattices (14, 16, and 18), each separated by several millimeters, will be used to produce the focused beams.

The beams will not have to be as finely focused as in a typical CRT. If the same 200-micron pitch that is used on the input side of the switch 9 is used on the output ports 21, then the spot size can be significantly larger than in CRTs, which typically arranged in groups of three sub-pixels at a 280-micron pitch per group.

Each cathode 11 will be associated with plurality of aiming anodes 16 that steer the beam produced by the cathode 11 toward the intended output port 21. It is preferred that four Aiming anodes 16 are used. One each of the aiming anodes 16 will be used to steer the beam up, down, left, and right. The aiming anodes 16 will be driven by digital-to-analog converters 23. These may in turn either be driven by microprocessors or by custom ASICs or FPGAs.

Note that, with large port counts, it would be impractical to use a single central controller for all of the emitter assemblies 40, because of the large number of emitter assemblies 40 that the controller would have to address. Instead, a number of localized controllers will be used, where each controller 32 is only responsible for a portion of the emitter assemblies 40 in the emitter array 10. These controllers 32 could be fabricated on the same wafer as the emitter assemblies 40, or they could be external to the substrate wafer 31. Either way, distributing the controllers greatly decreases addressing requirements.

An algorithm will be needed to determine how much voltage to apply to the aiming anodes 16 that are associated with a given emitter assembly 40 to direct the beam that is produced by the cathode 11 toward a given output port 21. A variety of beam steering algorithms have been employed in the past, including simple analog electronic circuits that employ op-amps. It may be desirable to use a computer to implement an intelligent beam steering algorithm that compensates for nearby magnetic fields and also compensates for manufacturing defects.

One implementation of such an algorithm would be to have each controller 32 create a two-dimensional table in memory. One dimension would be for emitter assemblies 40, and the other dimension would be for output ports 21. Each cell of the table would store a value that indicates the amount of voltage needed on each of the emitter assemblies 40 aiming anodes 16 in order to cause the beam that is produced by the emitter to strike the output port 21. The device would have an "initialization mode" during which the controllers 32 populate their tables on an emitter-by-emitter and target-by-target basis.

However, such granularity is probably overkill. For large numbers of output ports 21, it would require a very large amount of memory to create the tables. Also, it would require a significant amount of time to populate the table. For example, a switch 9 that has one million emitter assemblies 40 and one million output ports 21 would require the controllers 32 to populate a total of one trillion cells. Therefore, this algorithm would only be practical for smaller switches that have no more than several thousand output ports 21. For example, a switch 9 that has one thousand emitter assemblies 40 and one thousand output ports 21 would only require a total of one million cells.

For larger port counts, the algorithm will have to be capable of making generalizations. For example, the controllers can assume that if one emitter assembly 40 behaves a certain way, then nearby emitter assemblies 40 are likely to behave the same way. One implementation of this algorithm would use a technique that is commonly used in computer graphics known as spatial decomposition. Like the previously described algorithm, spatial decomposition is based on a two dimensional grid. However, spatial decomposition allows the sizes of the cells in the grid to vary. Varying grid cell sizes in this way allows regions of the table that are more regular and contain fewer distinct features to be represented with larger grid cells than regions of space that are less regular and contain many distinct features. If large portions of the table are regular, then this allows the table to occupy significantly less memory. In the application, spatial decomposition would be applied as follows:

1. Test an emitter in the center of the emitter array.

2. Assume that all of the emitters in the array behave exactly the same way as this emitter. This allows the entire table to initially be represented as a single large cell.

3. Test the assumption of step 2 by testing the central emitter in each of the four quadrants around the original central emitter. If any of the emitters behaves differently than the central emitter, then subdivide the initial large cell into four smaller cells.

4. Recursively perform step 3 for each of the four new cells.

Digital to analog converters 23 will be needed to control the aiming anodes. These may either be built into the wafer that contains the guns, or the may be mounted outside the main switch wafer 31.

The speed of the D/A converters 23 will be the main determinate of the switching speed of the switch 9. Resistor arrays may be used as a faster alternative to D/A converters 23. However, because a very large number of resistors would be required, this approach would only be viable for relatively small port count versions of the switch 9.

A roughly one-cm thick layer 33 of ceramic will be placed over the accelerating grid. Holes will be drilled or etched through the ceramic layer 33 to reach the cathodes 11, and four insulated copper wires will be placed through the holes. A 100-micron hole will then be drilled through the four wires to create four separate conductive surfaces. These surfaces will function as the aiming anodes 16. The aiming anodes 16 can also be formed using normal deposition techniques.

Because of their circular shape, the aiming anodes 16 will not produce deflection angles that are precisely proportional to voltage, as would be necessary in a display application. However, in the application, the output ports 21 in the detector array 20 may be patterned to compensate for the distortion. It is envisioned that the aiming anodes 16 can be designed to produce deflection angles proportioned to the applied voltage.

The aiming anodes 16 are embedded in the ceramic layer 33, and the 100-micron emitter assembly 40 diameter will be significantly smaller than the 250-micron emitter assembly 40 pitch. As a result, isolation between the emitter assemblies 40 should be extremely high. No significant crosstalk will result from the aiming anodes 16 of neighboring emitter assemblies 40.

If cold cathodes **11*b* are used within the emitter array 10, then a modulating array 18 must be employed to convert signals that arrive on the input side of the switch 9 into voltage modulations of the electron beams. Because the strength of electrostatic fields decreases exponentially with distance, the modulating array 18 must be closer to the emitter cathode 11 than the accelerating anodes 14. This will allow a relatively low voltage signal on the modulating array 18 to significantly affect the final voltage of the beam after it has passed through the much higher voltage of the accelerating anodes 14**.

There are many possible ways to drive the modulating cathode arrays 18. Ideally, the gate cathodes in the modulating cathode arrays 18 would be driven directly by a photodetector that is fabricated on the same wafer as the modulating array 18. This would allow a very short trace length between the photodetector and the modulating cathode arrays 18, which would allow higher data rates.

However, in some applications, such as the application in which the device is used as the switch core of an electronic router, input will be brought into the switch 9 through a ball grid array 24 that is attached to a circuit board such as a router's backplane. In this situation, it is likely that LVDS (low-voltage differential signaling) will be required to allow high data rates.

The modulating array 18 converts the signals that arrive on the input side of the switch into voltage modulations of the electron beam. The switch 9 requires no semiconductor logic or even amplifiers between the input signals (LVDS in the router switch core version of the switch) and the electron beam. The analog input voltage will directly drive the modulation anode without any processing.

As a modulating array 18 is used to modulate the beam's voltage rather than a cathode, the beam will never be turned all the way off, regardless of the input voltage. At the detector array 20, the baseline beam voltage will be subtracted from the detected voltage by a resistor as the signal is converted back to LVDS.

Depending on the strength of the beam that is produced by the emitter assemblies 40, amplification on the detector side may not be necessary. In fact, the cathode 11 and the emitter assembly 40 structure is an amplifier in and of itself and in fact is similar to a vacuum tube amplifier. Because of the exponential relationship between distance and the strength of electrostatic fields, placing the modulating array 18 significantly closer to the emitter cathode 11 than the accelerating anodes 14 allows a relatively small voltage to control a much larger beam voltage. Increasing the voltage on the accelerating anodes 14 increases the beam voltage. As a result, it is likely that no amplification will be required on the detector side of the switch.

Several different types of detectors and output models are available depending on the application.

In applications in which the switch will be packaged as a component that is attached to a circuit board, a simple conductors will be used as a detector. The conductors will drive low-voltage differential signaling pin pairs, which in turn will drive traces on the circuit board that the switch is connected to.

However, in some application, photonic output is more desirable than electronic output. Several options are available to create photonic outputs. These include:

Use phosphors as the detectors. Phosphors convert freespace electrons to photons directly without solid-state electronics. However, phosphors do not produce coherent light as lasers do. Also, phosphors require a relatively large emitting area in order to produce bright output.

However, these problems are no different than the problems encountered when using LEDs for communications applications. Like LEDs, phosphors will probably be confined to short-distance applications using multi-mode fiber. They would be most useful when used as a photonic fanout. This would bypass the high-speed transmission line issues encountered by electronic fanouts.

Have the conductor/detectors drive VCSELs (vertical cavity surface-emitting lasers). VCSELs are lasers that can be fabricated in arrays on wafers. One of the major difficulties in creating VCSEL arrays is that VCSELs tend to have a very high defect rate-typically on the order of 10%. Because of the large port count and the low cost per port, we will simply ignore defective VCSELs. A defective VCSEL will simply result in a non-functioning lambda. With up to thousands of lambdas per fiber, a 10% defect rate will be acceptable as long as the cost per port is sufficiently low.

The detector array will consist of an array of simple conductors, with resistors used to bias the voltage down to LVDS levels. Since each emitter-detector pair is, in essence, a vacuum tube amplifier, no external amplification will be needed in order to obtain the voltages needed to produce LVDS signals. Higher voltages can be received at the detector simply by increasing the voltage on the accelerator anodes 14.

As with most CRT displays, it may be necessary to trim the voltages on the aiming anodes 16 in order to compensate for nearby magnetic fields. The switch 9 will use the same mechanisms that CRT displays use in order to accomplish this. This is because the target size in the switch is larger than in most monitors, which fit three sub-pixels into every 280 microns. Also, the distance that the beam will travel from the start of the accelerating grid to the target will be much shorter.

The vacuum enclosure 33 will be created using a standard metal hermetic package, as used in many communications lasers. Vacuum will be maintained by getters that are identical to the getters in CRT displays. As a result of this choice in package, the switch will not be significantly heavier than other electronic components of the same size that use hermetic packages, such as communications lasers. This will allow the switch 9 to be mounted onto a board that uses standard connectors. Rigidity and overall toughness will also be similar to other hermetically sealed components.

In some applications, the switch will be mounted to a circuit board. Several issues must be resolved in order to allow this to happen:

The emitter array 10 and detector array 20 will be packed as close together as possible in order to decrease the necessary beam deflection angles, possibly at a sub-micron pitch. However, typical ball grid arrays have a 400-micron minimum pitch. Therefore, a fanout will be required to send signals from the ball grid array to the emitters.

The switch 9 is not two-dimensional like most ICs. Instead, it has two surfaces, the emitter array 10 and the detector array 20, which are separated by a length that is several times the length of the aiming anodes 16. If the emitter side of the switch 9 is mounted flat on the circuit board, then detector array will not touch the board. It will be necessary to send signals from the detector array back down the board. One way to do this would be by sending the output from the detector array 20 to another set of emitter assemblies 40 that are on the detector side of the switch. These emitter assemblies 40 may or may not be aimable. Optionally, they could always be pointed at a detector 25 on the input side of the switch 9 that touches the circuit board. This detector 25 would then drive a pin (or a pair of pins of LVDS is used) to send data over the circuit board.

A large port count switch 9 would require a large number of traces on the circuit board. However, most circuit boards would reach their maximum trace density very quickly if a 400-micron ball pitch is used. Therefore, it will probably be necessary to use a significantly larger pitch in order to decrease the trace density on the board. On way to do this would be to use a multistage fanout. The first fanout will occur on the switch wafer 31, where signals from the very dense emitters 10 and detectors 20 are fanned out to the ball grid array 24. Most of the wafer 31 will probably be dedicated to this first stage of the fanout. The second stage will occur on a special multi-layer ceramic circuit board that fans signals out from the switch's ball grid array to another ball grid array on the bottom of the circuit board. This ball grid array is then mounted on the user's circuit board.

In the router switch core version of the switch 9, it will be necessary to send the signals from the detector array 20 back to the ball grid array 24 on the other side of the switch. For lower port count versions of the switch, this will be done using a flex circuit 26. For higher port counts, freespace electron transmission lines 26 will be used. A freespace electron transmission line will be created using an electron gun 28, similar to the guns that are on the input side but without the ability to change the deflection angle of the beams. This emitter will be permanently aimed at a detector 25, which will be placed above a ball in the ball grid array that connects the switch 9 to the router's backplane. These transmission lines will be capable of virtually unlimited data rates.

This interconnect scheme is only necessary in applications in which the interface to the input ports and the output ports must be on the same side of the switch, in order to plug the switch 9 into a backplane.

In the electronic router switch core application, the switch 9 will be mounted directly to the router's backplane. It cannot be mounted onto a board that plugs into the backplane, because of the large number of connectors that will be required. However, the low component count makes mounting the switch 9 to the backplane feasible.

Two bi-directional analog LVDS lines and two single-direction analog lines will be required to drive each gun/detector pair. Therefore, a 4,096-port switch 9 will require 16,384 lines. These lines will be fanned out across the die onto a ball grid array 24. A 0.5-mm ball pitch will allow the balls to fit within a square that is 64-mm on a side. The ball array for the 16K-port version of the switch 9 will fit within a square that is 128-mm on a side. Individual defects in the ball grid array will be ignored, and affected emitter assemblies 40 will simply not be used.

In order to reduce the fanout requirements on the backplane itself, the switch's die will be mounted onto a special many-layered board that will increase the fanout from 0.5 mm to 1.5 mm. This board will then be mounted to the backplane. This multi-layered package will take advantage of the more narrow line width on the die for the first stage of the fanout, and will use a special board with many layers for the second stage. Note that in the 4,096 -port version of the switch, this multi-stage fanout might not be required, since the 1.5-mm ball pitch can be obtained on the wafer itself.

In the optical cross connect application, the fanout problem will be reduced by putting as much of the support hardware on the switch 9 die itself. For example, since perfect yield is not important in this application, it may be possible to integrate an array of VCSEL pump lasers directly onto the detector array 20. Similarly, an array of photodetectors may be integrated onto the emitter array 10. Alternatively, photocathodes 11*c* could be used rather than traditional photodiodes. Photocathodes 11*c* exist that have femtosecond response time and are sensitive to single photons. Eventually, it may also be possible to integrate simplified packet forwarding engines and D/A converters 23 onto the input-side die. This will allow the traffic manager that controls the switch 9 to encode the output port number within the data frames, thereby reducing the electronic interconnects per port to two if electronic data interconnects are used, or zero if photonic interconnects are used.

The switch 9 of the present invention is bit-rate independent. It simply creates an analog transmission line from the emitter assembly 40 to the output port 21 that can handle OC-768 speeds and beyond. The switch 9 by virtue of its simplicity allows virtually an unlimited port count from a tiny footprint. Using a conservative gun pitch of 200 microns, 96,000 ports would fit within a wafer that is 63 mm on a side.

The switching latency (port-to-port switching speed) of the switch 9 of the present invention is purely a function of the speed of the digital to analog converters 23 that drive the aiming anodes on the electron guns. Today's D/A converters 23 typically run on a 4 ns clock, and this could easily become sub-nanosecond if lower switching latency is required.

The electronic conversion allows the switch 9 to perform wavelength translation in order to prevent wavelength "collisions". In applications in which the switch 9 is controlled by the bit stream that is being switched, the electronic conversion gives the switch 9 the ability to peer into the bit stream in order to extract routing information. This is necessary for switches that operate on a packet-by-packet basis.

The switch 9 of the present invention is useful in large cross-connect switches have uses in many applications, including telecommunications, storage area networks, and large-scale parallel computer interconnection networks. Most optical cross connects fall into one of the following categories:

Switches that perform coarse, fiber-to-fiber switching. The switches 30 disclosed herein are most useful as protection switches, where the entire contents of a fiber must be routed around a breakage. They can also be used as very coarse provisioning switches. =p Lambda provisioning switches that operate on a lambda-to-lambda basis rather than on a fiber-to-fiber basis. Provisioning switches create and tear down connections between lambdas in response to external, out-of-band commands.

Dynamic lambda switches that create and tear down lambda-to-lambda connections in response to in-band routing information, such as packet headers. They are most useful at the edge, where they can be used to aggregate many slower lambdas into a single high-speed lambda.

As it is now possible to carry over 800 fibers in a single cable, and soon it will be possible to carry 2,000 lambdas on each fiber. This results in over 1.6 million lambdas per cable, and dozens of cables can be run in each conduit. Clearly, no matter how the topology evolves, the few thousand ports that will be offered by existing switching technology over the next two to four years are hopelessly inadequate for dealing with this deluge of circuits. This environment calls for switches that can scale into the hundreds of thousands or millions of ports within a reasonable timeframe.

The switch 9 of the present invention can optionally function edge of the network. Operating at the edge plays well to many of the switch's strong points:

Most of the ports in an edge switch would have copper interfaces rather than fiber interfaces. This would remove the need for expensive lasers, which would greatly reduce the cost per port, allowing us to take full advantage of the high port count capability of the switch 9.

Technology exists today to create arrays of relatively short-haul VCSEL lasers that would be inexpensive as long as perfect yield within the array is not an issue, as is the case with this application.

An IP packet-forwarding engine could be greatly simplified if it were optimized for edge applications. Many of the complexities of IP routing, such as ICMP, checksum testing, and loop detection could all safely be ignored at the edge as long as the peer is an endpoint. This would allow us to take advantage of the fast switching speed by decreasing the cost of the hardware t needed to perform packet forwarding.

Figure 4:
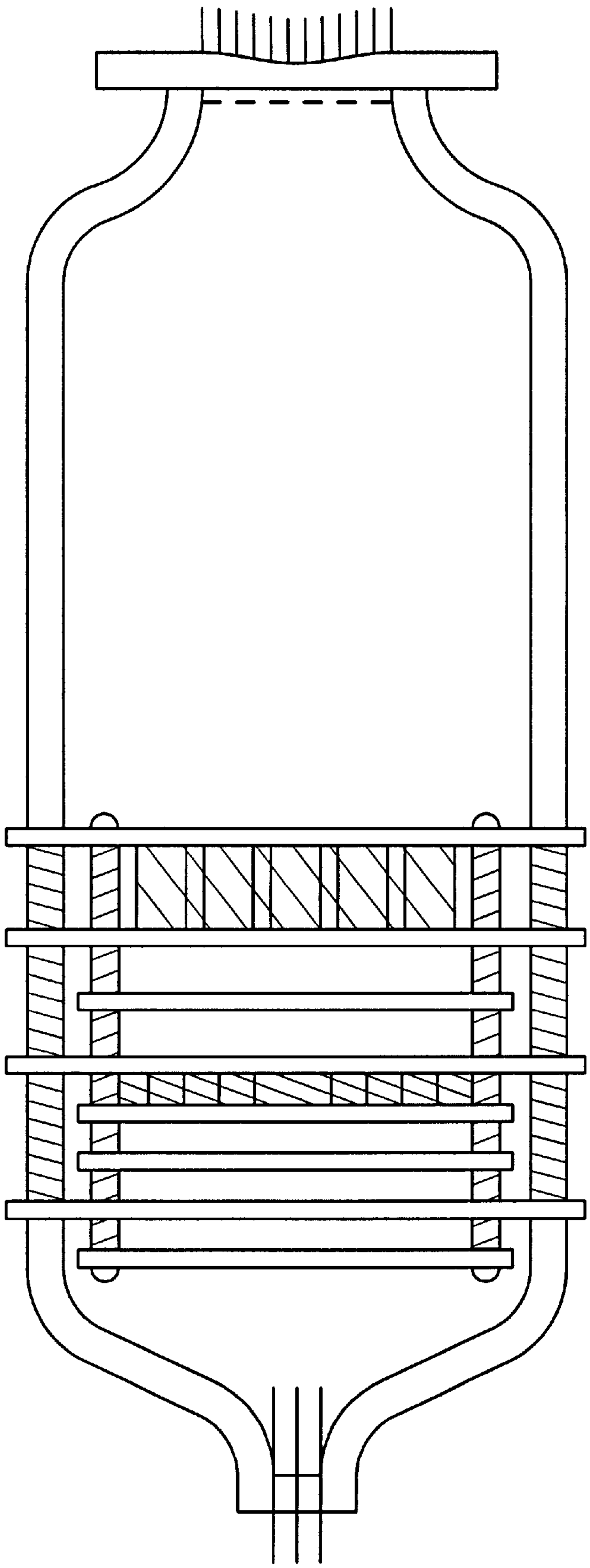
FIG. 4 discloses a multi-gun switch of the present invention.

FIG. 4 represents a multi-gun structure of a preferred embodiment of the current invention. Shown is a multi-gun switch 50 disposed within a glass tube chamber 52. The glass tube chamber 52 defines an interior evacuated cavity 54. Supporting the switch structure 56 is a plurality of ceramic rings 58 which support a switch support structure 60. The switch support structure 60 supports a first cathode plate 62 for generating free space electrons. The cathode plate 62 has a plurality of cathodes 11 (not shown) which correspond to a respective input line. In the event that the cathode plate 62 Is a hot cathode, a cathode heater 64 will be necessary. The cathode heater being powered by the cathode heater lines 66. Disposed between the aluminum focusing block 68 and the cathode plate 62 is a plurality of aperture plates 69 which act to regulate the beams produced by the cathode plate 62.

The aluminum focusing block 68 has a plurality of apertures defined therein that are aligned with the apertures of the aperture plate 69 and the cathodes. A second aperture plate 70 is optionally disposed between the aluminum focusing block 68 and the aluminum deflector shield layer 71. The aluminum focusing block 68 functions to focus and accelerate the electron beam toward the aluminum deflector shield layer 71. The aluminum deflector shield layer 71 has a plurality of controllable aiming anodes (not shown) to direct the electron beam produced by the cathode plate 62 to a phosphorus screen or target header 72 disposed at the far end of the vacuum chamber 54.

Figure 5:
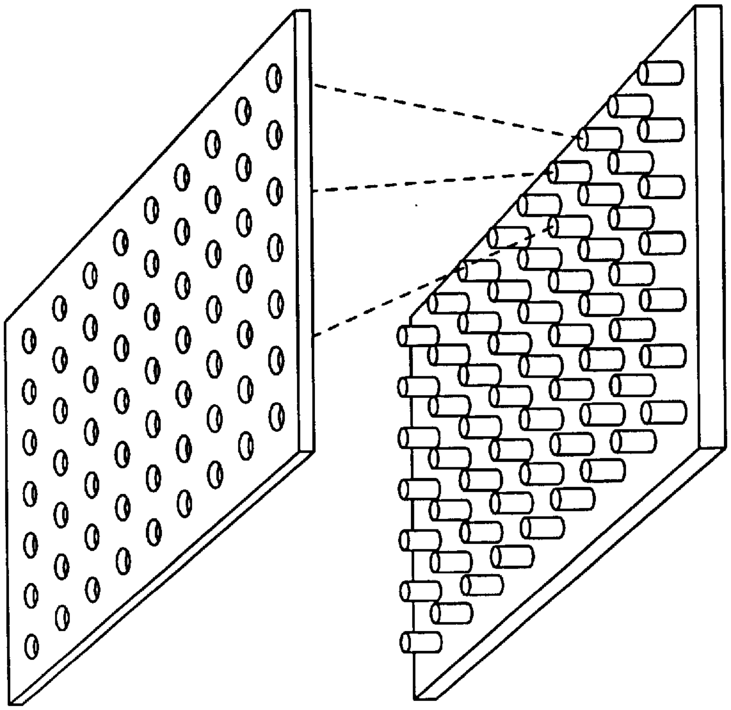
FIG. 5 represents a perspective view of a layered switch configuration.
Figure 3:
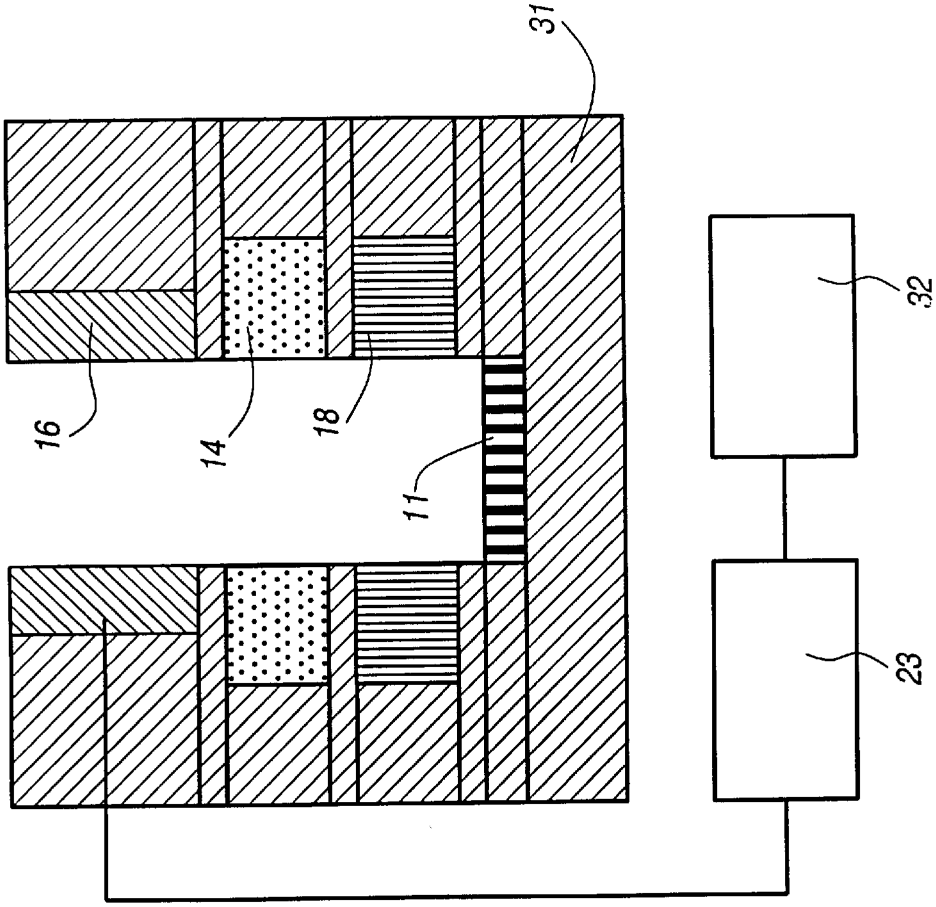
FIG. 3 discloses a cross-section of a single emitter of the switch of the current invention.

FIG. 5 discloses an emitter array 10 disposed on a substrate 31. Also shown is the relationship between the emitter array 10 and the detection grid 25 as well as a plurality of emitted beams 26 being directed towards the detection array 25.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention.

What is claimed is:

1. A free space electron switch comprising:

a cathode array, said cathode array including a plurality of cathodes, each of said cathodes operable to emit electrons;

an anode grid, said anode grid including a plurality of aiming anodes, each of said aiming anodes defining a channel, each anode operable to aim an electron beam formed from the electrons emitted from one of said cathodes;

a plurality of the output ports, each output port operable to receive an electron beam from at least one cathode; and a focusing and accelerating grid disposed between said cathode array and said plurality of output ports, said focusing and accelerating grid operable to control the flow of electrons from each of said cathodes into each of said channels.

2. The free space electron switch according to claim 1 wherein each of said aiming anodes extends in two dimensions of each said cathodes such that the channels have a surrounding periphery of aiming anodes.

3. The free space electron switch according to claim 1 wherein each of said aiming anodes is responsive to a charge which aims the emitted electrons to an output port.

4. The free space electron switch according to claim 1 wherein the plurality of output ports is disposed adjacent the cathode array.

5. The free space electron switch according to claim 1 wherein each of the channels has a diameter from about 1 micron to about 6 inches.

6. The free space electron switch according to claim 1 wherein each of the aiming anodes is between about 0.05 mm to about 50 mm in length.

7. The free space electron switch according to claim 1 further comprising controller located adjacent to the cathode array operable to control the aiming anodes.

8. The free space electron switch according to claim 1 wherein each of the cathodes is photocathodes.

9. The free space electron switch according to claim 1 wherein each of the cathodes is cold cathode.

10. An electron source switch comprising:

a cathode for emitting electrons in response to an input signal;

a ceramic layer defining at least one channel extending therethrough;

a modulating array for forming electrons received from the cathode into an electron beam, said modulating array directing the electrons through said channel toward an output port; and an aiming anode having a plurality of states, said anode being selectively actuable to steer the electron beam to the output port.

11. The electron source as claimed in claim 10 wherein the cathode is a cold cathode.

12. The electron source as claimed in claim 10 further comprising a modulating electrode grid disposed between the cathode and the aiming anode for controlling a flow of electrons from the cathode into the channel.

13. The electron source as claimed in claim 12 wherein the modulating electrode grid is disposed adjacent a surface of the cathode facing the aiming anode.

14. The electron source as claimed in claim 12 wherein the modulating electrode grid comprises a plurality of parallel row conductors and a plurality of parallel column conductors arranged orthogonally to the row conductors, said at least one channel being a plurality of channels where one of the channels is located at a different intersection of a row conductor and a column conductor.

15. The electron source as claimed in claim 10 wherein the cathode is a photocathode.

16. The electron source as claimed in claim 10 wherein the at least one channel is a plurality of channels disposed in the ceramic layer as a two dimensional array of rows and columns.

17. The electron source as claimed in claim 10 further comprising a focusing grid.

18. The electron source as claimed in claim 10 wherein the ceramic layer includes aluminum.

19. The electron source as claimed in claim 10 wherein the output port is coupled to a VCSEL pump laser.

20. The electron source as claimed in claim 10 wherein the aiming anode is coupled to a digital-to-analog converter, said digital-to-analog converter being used to change the anodes state.

21. The electron source as claimed in claim 10 wherein the channel is round in cross-section.

22. The electron source as claimed in claim 10 wherein the cathode is a hot cathode.

23. The electron source as claimed in claim 10 wherein the ceramic layer includes a stack of perforated laminations, where the perforations in each lamination are aligned with the perforations in an adjacent lamination to continue the channel through the stack.

24. The electron source as recited in claim 23 wherein each lamination in the stack is separated from an adjacent lamination by a spacer.

25. The electron source as claimed in claim 10 further composing an accelerator disposed adjacent the cathode for accelerating electrons through the channels.

26. The electron source as claimed in claim 25 comprising a plurality of aiming anodes.

27. The electron source as claimed in claim 26 wherein the plurality of anodes comprise lateral formations surrounding the channels.

28. The electron source as claimed in claim 10 comprising means for applying a deflection voltage across the anode to deflect the electron beam emerging from the channel.

29. A switch device comprising:

an array of cathodes for emitting electrons;

an anode grid including a plurality of aiming anodes each defining a channel, each anode aiming an electron beam formed from the electrons emitted from a respective cathode;

an array of output ports for receiving electrons from the array of cathodes, the array of output ports having a receiving anode facing a side of a ceramic layer remote from the array of cathodes, the array of output ports comprising VCSEL pump lasers, each laser corresponding to a different output channel; and a generator which is capable of supplying control signals to the aiming anodes and to selectively control flow of electrons from the cathodes to the output ports via the channels.

30. The switch device of claim 29 wherein the cathodes are selected from the group consisting of photocathodes and cold cathodes.

31. The switch device of claim 29 wherein the anode grid is arranged to address electrons emerging from the channels to different ones of the output ports.

32. The switch device as claimed in claim 29 further comprising a ball grid coupled to the array of output ports.

33. A free space electron amplifier comprising:

an array of cathodes for emitting electrons in response to an input signal;

a plurality of output ports for receiving an electron beam from each cathode, the output ports facing and remote from the array of cathodes; and a focusing and accelerating grid defining an array of channels disposed between the array of cathodes and the plurality of output ports, said focusing and accelerating grid control the flow of electrons from the array of cathodes into each channel and amplify the input signal.

34. The free space electron amplifier of claim 33 further comprising a plurality of signal input sources coupled to said array of cathodes.

35. The free space electron amplifier of claim 34 wherein the signal input sources are copper wires.

36. The free space electron amplifier of claim 35 wherein the signal input sources are fiber-optic elements.

37. The free space electron amplifier of claim 34 wherein the output ports are coupled to copper wires.

* * * * *

UNITED STATES PATENT AND TRADEMARK OFFICE

CERTIFICATE OF CORRECTION

PATENT NO. : 6,407,516 B1
DATED : June 18, 2002
INVENTOR(S) : Michel Victor

It is certified that error appears in the above-identified patent and that said Letters Patent is hereby corrected as shown below:

Column 4,
Line 26, "he" should be -- the --.

Column 11,
Line 45, before "Lambda" delete "=p".

Column 12,
Line 16, after "hardware" delete "t".
Line 28, delete "Is" and substitute -- is --.

Signed and Sealed this

Second Day of December, 2003

JAMES E. ROGAN
*Director of the United States Patent and Trademark Office*